(12) United States Patent
Van Wiemeersch

(10) Patent No.: US 8,907,620 B2
(45) Date of Patent: *Dec. 9, 2014

(54) PROVIDING A CHARGING EVENT FOR A VEHICLE BATTERY

(75) Inventor: John Robert Van Wiemeersch, Novi, MI (US)

(73) Assignee: Ford Global Technologies, Dearborn, MI (US)

( * ) Notice: Subject to any disclaimer, the term of this patent is extended or adjusted under 35 U.S.C. 154(b) by 945 days.

This patent is subject to a terminal disclaimer.

(21) Appl. No.: 13/043,676

(22) Filed: Mar. 9, 2011

(65) Prior Publication Data

US 2011/0163718 A1    Jul. 7, 2011

(51) Int. Cl.
*H02J 7/00* (2006.01)
*H02J 9/00* (2006.01)
*B60R 25/00* (2013.01)
*F02N 11/08* (2006.01)
*H02J 7/14* (2006.01)

(52) U.S. Cl.
CPC ............... *H02J 9/002* (2013.01); *B60R 25/00* (2013.01); *F02N 11/0862* (2013.01); *H02J 7/14* (2013.01); *F02N 2200/061* (2013.01)
USPC ................. 320/109; 180/65.1; 180/65.21

(58) Field of Classification Search
CPC ..................................... Y02T 90/14
USPC ............ 320/109, 104, 123, 124; 180/65.21, 180/65.1, 54.1
See application file for complete search history.

(56) References Cited

U.S. PATENT DOCUMENTS

| | | |
|---|---|---|
| 4,296,334 A | 10/1981 | Wong |
| 4,488,521 A | 12/1984 | Miller et al. |
| 6,028,372 A | 2/2000 | West et al. |
| 6,561,151 B1 | 5/2003 | Wisnia et al. |
| 7,146,959 B2 | 12/2006 | Thompson et al. |
| 7,647,908 B1 | 1/2010 | Biondo et al. |
| 2006/0080007 A1 | 4/2006 | Gerard et al. |

*Primary Examiner* — Yalkew Fantu
(74) *Attorney, Agent, or Firm* — Angela M. Brunetti; Frank MacKenzie

(57) ABSTRACT

A method for providing a battery charging event comprises a plurality of operations. An operation is performed for inhibiting a first battery load from drawing electrical current from a battery charging system of a vehicle. An operation is performed for activating ignition circuitry of the vehicle after said inhibiting of the first battery load. An operation is performed for starting the engine after said ignition circuitry activation. An operation is performed for inhibiting a second battery load from drawing electrical current from the battery charging system after said starting of the engine. An operation is performed for causing an output of an alternator of the vehicle to be adjusted dependent upon a present location of the vehicle.

16 Claims, 5 Drawing Sheets

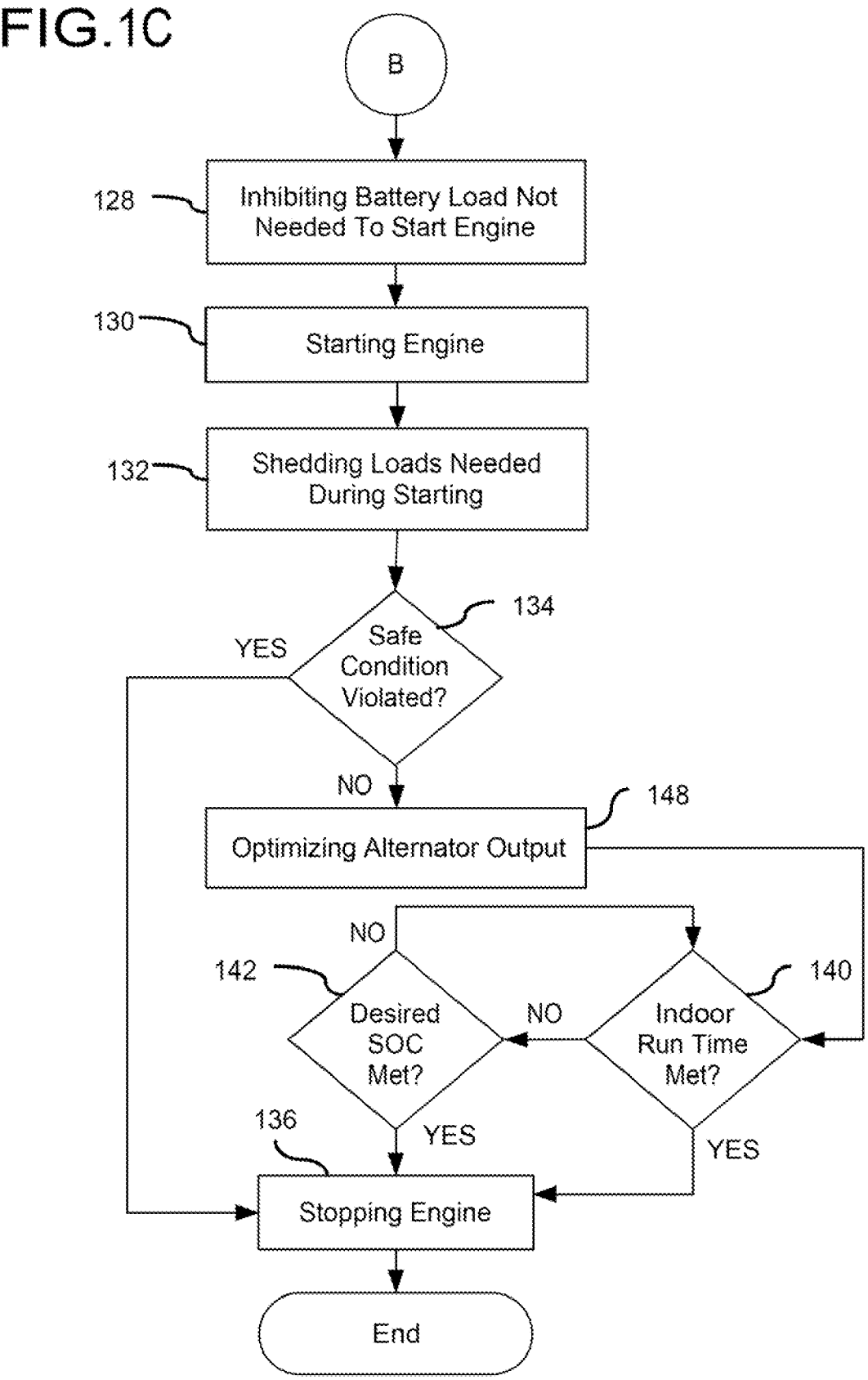

PROVIDING A CHARGING EVENT FOR A VEHICLE BATTERY

CROSS REFERENCE

This application is related to co-pending U.S. patent application Ser. No. 13/043,709, filed Mar. 9, 2011, entitled "Providing a Charging Event for a Vehicle. Battery".

FIELD OF THE DISCLOSURE

The disclosures made herein relate generally to automotive electrical systems and, more particularly, to methods and systems for providing a highly-optimized charging event for a vehicle battery.

BACKGROUND

Automotive OEMs (original equipment manufacturers) typically require an electrical system (e.g., a battery and associated key-off loads drawing battery power) of a vehicle to be configured in a manner for allowing the vehicle to be started after it has been static for up to 30 days (i.e., 30-day ready-to-start performance). Design targets for best-in-class performance assume a static KOL (key-off-load) of less than 15 mA (milli-amps). Unfortunately, a vehicle with an electrical system having a considerable number of KOLs and/or power intensive KOLs can have a KOL need of 20 mA to 30 mA. This being the case, it can be a challenge to maintain a minimum acceptable SOC (state of charge) for a battery of such a vehicle.

Known solutions for achieving 30-day ready-to-start performance often drive added cost to a vehicle, reduced feature content capability, and/or shedding of electrical loads over the 30-day period. It is well known that shedding of electrical loads can cause certain systems to appear to be malfunctioning, which can result in TGW (Things-Gone-Wrong) demerits to an OEM of the vehicle, adverse customer satisfaction ratings, and/or increased warranty clams if parts are replaced.

During slow sales periods, lot storage times can exceed 30 days at the OEM's manufacturing site, dealer sales/storage lots, or a combination of both. During these slow sales periods or for vehicles being shipped long distances, static storage time needs of OEMs can often be as much as 120 days or greater. As such, solutions for achieving over 120 days of ready-to-start performance require shedding almost all KOLs and dropping the 15 mA static 30-day KOL target to zero or near zero. This ultra low level of KOL will naturally result in higher levels of TGWs and warranty risk for a 120-day ready-to-start system relative to issues experienced with a 30-day ready-to-start system due to the need to completely disconnect all high KOL systems and the resulting loss of total feature/function.

Various approaches for enhancing 30-day ready-to-start performance are known. To enhance their effectiveness and/or practicality, minor improvements in KOL can be achieved by zero cost methods such as reduced scan rates for radio frequency (RF) receivers and digital input/output (I/O) signals. However, these types of improvement approaches offer only minor KOL reduction (e.g., 100-200 uA) and create the risk of TGWs and warranty for affected systems (e.g., remote entry, alarms, tire pressure sensing, and others). Furthermore, such known approaches for enhancing 30-day ready-to-start performance are also known to have certain shortcomings that limit their effectiveness and/or practicality with regard to cost, weight, and/or vehicle modularity (i.e., use across multiple models of vehicles).

One such approach for enhancing 30-day ready-to-start performance relates to use of a larger battery for enhancing 30-day ready-to-start performance, which can add cost (e.g., as much as $10, per vehicle) and/or weight, (e.g., as much as 10 lbs per vehicle). Another such approach for enhancing 30-day ready-to-start performance relates to automated load shedding via semiconductor switches in a vehicle that has only one Hot At All Times (HAAT) power feed and having a Bipolar or FET switch (pass circuit) to fully activate the module for normal RUN operation. Implementation of such semiconductor switched load shedding is possible through use of circuits capable of being selectively switched off (e.g., via a network message) to lower KOL. However, this type of automated load shedding can add cost (e.g., as much as $1 to every effected module needing a robust protected pass circuit) and/or increase the potential for TGW demerits and warranty risks. Another such approach for enhancing 30-day ready-to-start performance relates to automated load shedding using a latching relay rather than a conventional relay because the relay and control circuit cannot draw any power after it switches the desired loads open circuit. The latching relay needs to be scaled for the total normal RUN current expected from the effected modules because the module KOL power feed is typically also the same feed used for RUN current consumption. Such a latching relay and control circuit can add cost (e.g., as much as $4 per vehicle) and/or increase the potential for TGW demerits and warranty repairs. Another such approach for enhancing 30-day ready-to-start performance relates to removable bus bars. But, their associated install/removal labor costs, the fixed cost of the bus bar/associated fuse socket, and/or issues adversely affecting vehicle modularity make them an undesirable solution. Yet another such approach for enhancing 30-day ready-to-start performance relates to reducing KOL by use of low quiescent regulators and other low power semiconductor devices, which can add cost (e.g., as much as $0.25 or more per device).

Various known aftermarket (A/M) remote start systems offer the capability of starting a vehicle's engine if the ambient temperature drops below a certain threshold and, optionally, if the vehicle battery falls below a certain voltage. However, there are several shortcomings associated with use of such known A/M remote start systems for managing SOC of the vehicle's battery. Because the primary function of A/M remote starter systems is to precondition a passenger cabin for comfort, one such shortcoming is that these remote start systems are not optimized or intended to reduce power consumption during such cabin temperature preconditioning (e.g., the air conditioning compressor and/or the blower fan are typically operated at maximum performance). Another such shortcoming is that these add-on remote start systems do not have access or ability to control all vehicle systems to aggressively minimize power demand of these vehicle systems during the remote start operation. Another such shortcoming is that, due mainly to emissions concerns, these remote start systems do not have provisions for causing the vehicle's engine to run at an idle level that is significantly higher than a target idle (e.g., higher idle than the idle during regular operation of the engine) or for extended periods as needed to properly charge the battery. Another such shortcoming is that these remote start systems can create a risk of a fire (e.g., from catalyst or exhaust heat when parked over dry vegetation). Still another such shortcoming is that, under the assumptions that the risk of a no-start condition due to lack of fuel is of a higher severity than a cabin that is too hot or too cold, these remote start systems are configured to cease operation if a low fuel level condition is exhibited (e.g., a fuel level that would be typical of that of a new vehicle at an OEM's manufacturing site or dealer sales/storage lot). Still another such shortcoming is that such remote start systems cannot implement desired measures to ensure vehicle security. Yet another such shortcoming is that such remote start systems that offer a simple vehicle start when the battery is low or cold require the customer to incur the cost of the complete system including components not required for implementing only a vehicle battery charge event (e.g., radio frequency receiver, antenna, control fobs, etc).

Therefore, providing a battery charge event in a manner that overcomes shortcomings associated with known remote start systems and with known approaches for enhancing ready-to-start performance would be advantageous, desirable and useful.

SUMMARY OF THE DISCLOSURE

Embodiments of the present invention provide for charging a battery of a vehicle if conditions exist that warrant starting the vehicle's engine to recharge the battery. More specifically, embodiments of the present invention provide for optimizing a charging event of a vehicle's battery, to improving safety during such charging event, to improving security during such charging event, and to reducing fuel consumption and overall carbon footprint during such charging event. This functionality is useful in beneficially affecting ready-to-start performance in vehicles that may sit unattended for as many as 120 days or more. Accordingly, a vehicle starting system and methodology configured in accordance with an embodiment of the present invention can be used for managing a vehicle battery state of charge in a manner that overcomes shortcomings associated with known remote start systems and with known approaches for enhancing ready-to-start performance.

In one embodiment of the present invention, a method for providing a battery charging event comprises inhibiting a first battery load from drawing electrical current from a battery charging system of a vehicle, starting an engine of the vehicle after such inhibiting the first battery load, and causing an output of an alternator of the vehicle to be maintained above a target idle output after starting the engine.

A method for providing a battery charging event comprises inhibiting a first battery load from drawing electrical current from a battery charging system of a vehicle, activating ignition circuitry of the vehicle after such inhibiting of the first battery load, starting the engine after the ignition circuitry activation, inhibiting a second battery load from drawing electrical current from the battery charging system after starting the engine, and causing an output of an alternator of the vehicle to be adjusted dependent upon a present location of the vehicle. Preferably, the target idle would be implemented for maximizing a rate of charging of the battery.

In another embodiment of the present invention, a processor-readable medium having tangibly embodied thereon and accessible therefrom a set of instructions interpretable by at least one data processing device. The processor-readable medium is a non-transient processor-readable medium. The set of instructions is configured for causing the at least one data processing device to carry out operations for inhibiting a first battery load from drawing electrical current from a battery charging system of a vehicle, starting an engine of the vehicle after such inhibiting of the first battery load, and causing an output of an alternator of the vehicle to be maintained above a target idle output after starting the engine.

Prior art approaches for remote starting of a vehicle are intended for: 1) creating cabin comfort (cooling or heating depending on season and climate) for the vehicle occupant(s), 2) warming an engine in lieu of an engine block heater, and/or 3) charging of the vehicle's battery without pre-start battery load shedding, post-start battery load shedding, and/or alternator output enhancement. By their very nature, prior art remote starting solutions intended for creating cabin comfort and/or for warming an engine will result in significant electrical power being consumed by current drawing components not necessary for starting the vehicle's engine and/or in electrical power being consumed by current drawing components not necessary for safe continued operation of the vehicle's engine for carrying out the intended goal of an optimized battery charging event. In contrast, embodiments of the present invention provide for enhanced alternator output with respect to an output of the alternator at a target engine idle speed (i.e., target idle output) and for reduction of electrical power that is consumed by current drawing components not necessary for starting the vehicle's engine and/or not necessary for safe continued operation of the vehicle's engine for carrying out the battery charging event.

These and other objects, embodiments, advantages and/or distinctions of the present invention will become readily apparent upon further review of the following specification, associated drawings and appended claims.

BRIEF DESCRIPTION OF THE DRAWINGS

FIGS. 1A-1C show a flow diagram of a method for providing a battery charging event in accordance with an embodiment of the present invention.

DETAILED DESCRIPTION OF THE DRAWING FIGURES

Figure 1A:
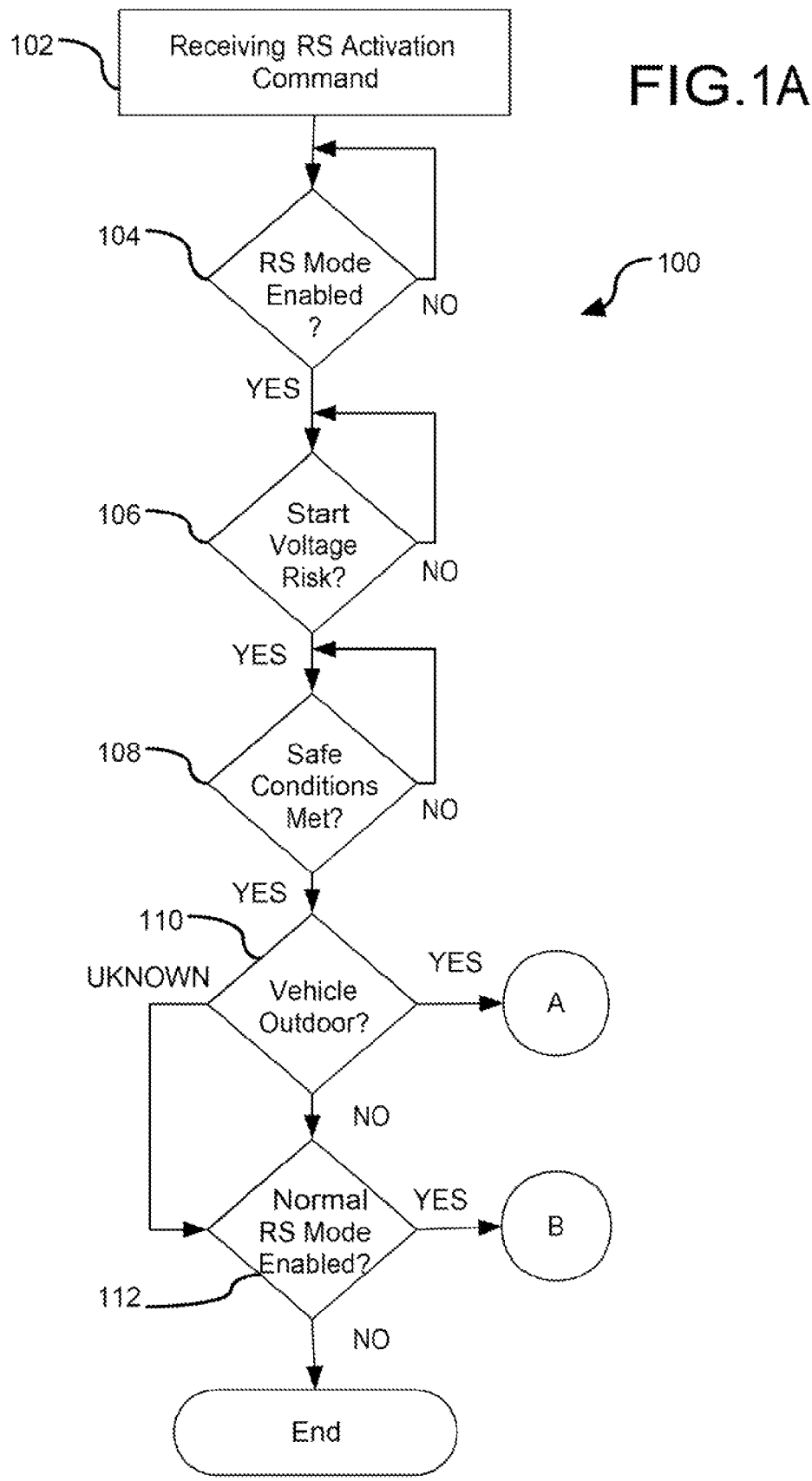
Figure 1B:
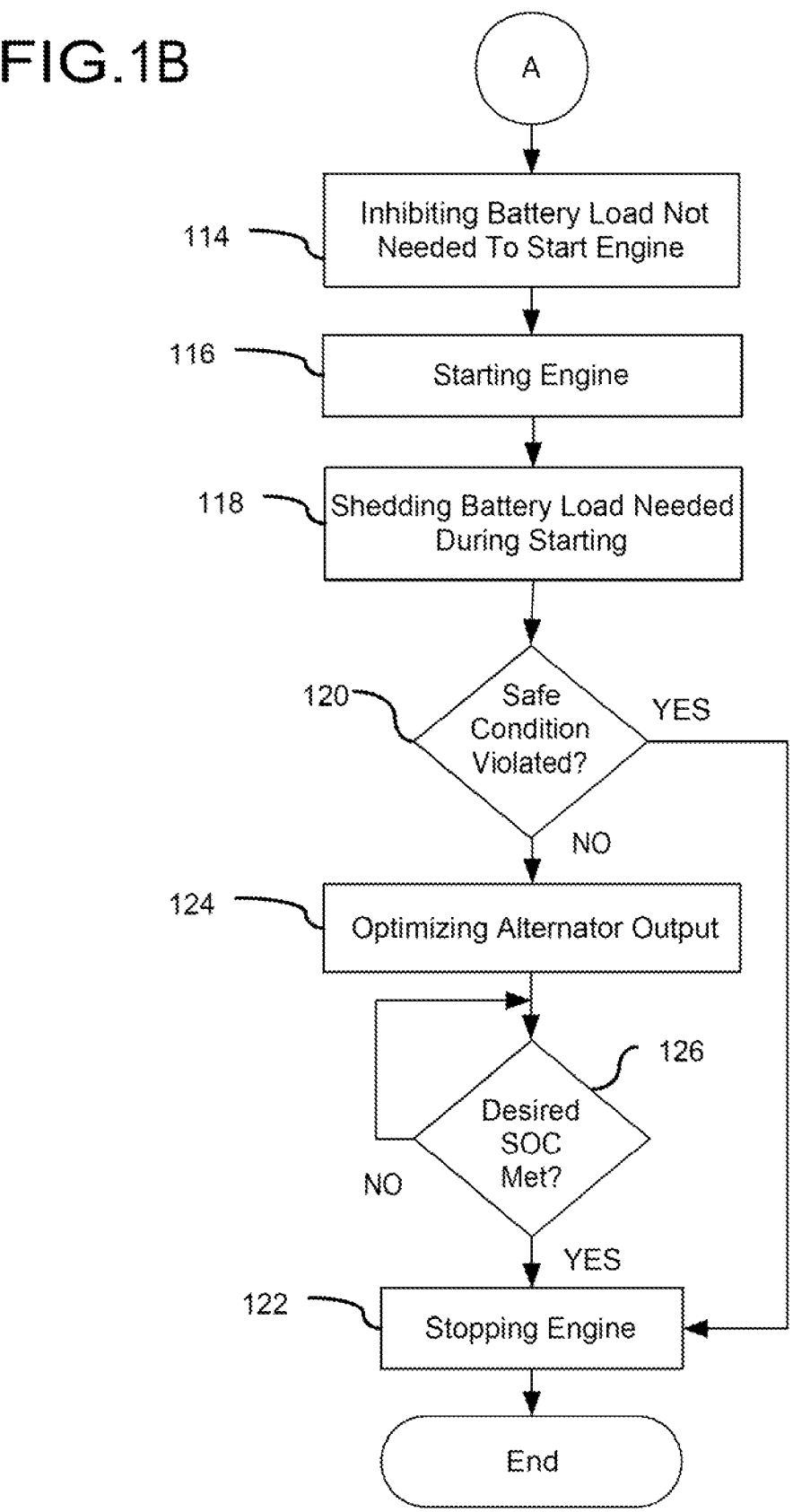

FIGS. 1A-1C show a flow diagram of a method 100 for providing a battery charging event in accordance with an embodiment of the present invention. The method 100 is configured for charging a battery of a vehicle by starting the vehicle's engine only if conditions exist that warrant starting the vehicle's engine to recharge the battery. The underlying functionality of the method 100 is referred to herein as a remote start charging mode (i.e., the vehicle having a remote start functionality configured for providing a battery charging event). Advantageously, such remote start charging mode seeks to optimise a charging event of the vehicle's battery, to improving safety during such charging event, to improving security during such charging event, and to reducing fuel consumption and overall carbon footprint during such charging event. In this manner, the method 100 is useful in beneficially affecting ready-to-start performance in vehicles that may sit unattended for long periods of time (e.g., as long as 120 days or more).

Referring to FIG. 1A, the method 100 begins with an operation 102 being performed for receiving a remote start activation command for activating a remote start charging mode. It is disclosed herein that the remote start command can be issued by any number of sources. In one embodiment, a vehicle configured for monitoring its own battery voltage and geographic location can issue the remote start command if the battery voltage is too low and the vehicle location is known to be a location acceptable for activating the remote start charging mode (e.g., determined using a global positioning system (GPS) of the vehicle). In another embodiment, the vehicle can send out a warning that its battery voltage is approaching a critical low state and, in response, a remote entity (e.g., vehicle plant personnel, vehicle rental lot personnel, etc) can cause a remote start activation command to be transmitted for reception by the vehicle (e.g., via RF signal or cellular signal) when it is known that the vehicle location is a location acceptable for activating the remote start charging mode. In another embodiment, the vehicle can be configured to issue a remote start command on a periodic interval (e.g., every X days) such as for example when it is known that the vehicle is in a location acceptable for activating the remote start charging mode. It is disclosed herein that the remote start command can also be issued in the case where battery voltage is known or anticipated to be at an acceptable level but ambient temperature at the location where the vehicle is located is known to be or anticipated to be at a level that may present a risk of the engine not starting (e.g., due to too cold of an engine).

In response to the remote start command being received, an operation 104 is performed for determining if the vehicle's remote start charging mode is enabled. If it is determined that the vehicle's remote start charging mode is not enabled, the method 100 can continue to check if the remote start charging mode subsequently becomes enabled (e.g., checks for a prescribed number of times and/or for a prescribed period of time before the method terminates). It is disclosed herein that the vehicle's remote start charging mode can be enabled after the vehicle receives the remote start command. For example, the vehicle's remote start charging mode can be enabled after the remote start command is received by the vehicle in response to the vehicle being moved from a location unacceptable for activating the remote start charging mode to a location acceptable for activating the remote start charging mode and/or a temperature dropping below a lower temperature limit within a prescribed period of time after the remote start command is received.

If it is determined that the vehicle's remote start charging mode is enabled, an operation 106 is performed for determining if the vehicle's battery is exhibiting a voltage that can put the vehicle at risk for not starting (i.e., a start voltage risk). If it is determined that the vehicle's battery is presently not exhibiting a start voltage risk, the method 100 can continue to check if the vehicle's battery subsequently exhibits a start voltage risk (e.g., checks for a prescribed number of times and/or for a prescribed period of time before the method terminates). For example, in the case where it has been estimated that the vehicle's battery is approaching a condition where it may be exhibiting a start voltage risk (e.g., vehicle is known to have been sitting unstarted for a particular number of days), the vehicle's battery may not yet actually be exhibiting a start voltage risk. Similarly, the vehicle's engine may have been manually started during a period of time that would otherwise result in a start voltage risk. As such, the method 100 not proceeding until a start voltage risk is present precludes unnecessary starting of the vehicle's engine.

If it is determined that the vehicle's battery is exhibiting a start voltage risk, an operation 108 is performed for determining if conditions for allowing the engine of the vehicle to be safely started have been met (i.e., safe conditions met). It is disclosed herein that such a safe condition determination can be made ad a different location in the method 100 and/or at one or more other locations within the method 100. If it is determined that specified safe conditions have not been met, the method 100 can continue to check if the safe conditions have subsequently been met (e.g., checks for a prescribed number of times and/or for a prescribed period of time before the method terminates). Examples of safe conditions include, but are not limited to, the vehicle's hood being closed, no adverse engine or emissions codes being present, transmission in park (automatic) or in neutral (manual), parking brake on, battery voltage drop rate within specified range, vehicle is in an outdoor/open parking structure (e.g., an open or ventilated parking garage) based on GPS location, vehicle is in designated parking area, and the like. It is also disclosed herein that such a safe condition determination can include determining if the vehicle is located on a hazardous surface (e.g., a non-paved surface (e.g., grass) as opposed to pavement).

If it is determined that conditions for allowing the engine of the vehicle to be safely started have been met, an operation 110 is performed for determining if the vehicle is in an outdoor/open parking structure. It is disclosed herein that such an outdoor/open parking structure determination can be made ad a different location in the method 100 and/or at one or more other locations within the method 100. Such information may have been previously determined in conjunction with assessing safe conditions of the vehicle. Examples of vehicle components/circuitry that can be used for determining if the vehicle is at an outdoor/open parking structure include, but are not limited to, a global positioning system, solar level detecting indicating sensors, cameras, radar sensors, ultrasonic sensors, and the like. It is also disclosed herein that such an outdoor/open parking structure determination can include determining if the vehicle is located over water (e.g., on a ship), travelling along railroad tracks (e.g., in/on a rail car), and the like.

The method 100 proceeds with implementing a battery charging event suitably configured for outdoor/open parking structure operation of the vehicle's engine (i.e., at segment A of the method 100) if it is determined that the vehicle is an outdoor/open parking structure. However, if it is determined that the vehicle is indoor or it is not determinable as to whether or not the vehicle is in an outdoor/open parking structure, an operation 112 is performed for determining if the remote start charging mode is enabled in a normal state. One example of a normal state is a state that includes provisions for allowing the vehicle's engine to be safely operated in an indoor location. The method 100 proceeds with implementing a battery charging event suitably configured for indoor operation of the vehicle's engine (i.e., at segment B of the method 100) if it is determined that the remote start charging mode is enabled in a normal state. Otherwise, the method 100 ends without starting the vehicle's engine.

As discussed above in reference to the operation 102 for receiving a remote start activation command it was disclosed that the remote start command can be issued by any number of sources. It is also disclosed herein that the remote command can optionally be issued at other relative positions within the method 100. For example, in an embodiment where the vehicle periodically monitors conditions such as whether remote start charging mode is enabled, whether there is a start voltage risk, whether required safe conditions are met, and/or whether the vehicle is located at an indoor location or an outdoor/open parking structure, the vehicle itself can issue the remote start command after determining that the remote start charging mode is enabled, after determining that there is a start voltage risk, after determining that required safe conditions are met, and/or after determining whether the vehicle is located at an indoor location or outdoor/open parking structure. Similarly, a remote state command transmitted for reception by the vehicle from a remote entity can be issued after determining that the remote start charging mode is enabled, after determining that there is a start voltage risk, after determining that required safe conditions are met, and/or after determining whether the vehicle is located at an indoor location or outdoor/open parking structure.

Referring now to FIG. 1B, the method 100 proceeds with implementing the battery charging event suitably configured for outdoor/open parking structure operation of the vehicle's engine in response to determining that vehicle is at an outdoor/open parking structure. An operation 114 is performed for inhibiting a battery load corresponding to vehicle operations not required for starting of the vehicle (i.e., a first battery load) from drawing current from an electrical charging system of the vehicle. The electrical charging system of the vehicle is disclosed herein to include the vehicle's battery(ies), an alternator(s), and other system components required for converting mechanical and/or thermal energy from the vehicle's engine to electrical power supplied to the battery(ies). Preferably, such inhibiting of the first battery load includes precluding the first battery load from drawing electrical current from the battery upon activation of ignition circuitry of the vehicle and after starting of the engine. It is disclosed herein that the first battery load can include current draw from a single current drawing component of the vehicle or current draw from multiple current drawing components of the vehicle.

It is disclosed herein that current draw components corresponding to the first battery load can be those that are operable only with ignition circuitry of the vehicle energized (i.e., activated) and/or those that can be operable independent of the ignition circuitry being energized. Examples of current drawing components of the vehicle which can contribute to the first battery load include, but are not limited to, electronic power assist steering, heated windshield, rear window backlite, heated seat(s), heated steering wheel, heated mirror(s), window defrost unit(s), climate control blower, climate control blend door movement, A/C mode, A/C compressor, wireless user interface controls, audio system components, heated windshield solvent reservoir, power seat(s), interior courtesy lighting, exterior lighting (e.g., with possible exception of park lamps being allowed to flash for indicating operation of remote start charging event in progress), alarm intrusion components, power access point(s), cigarette lighter(s), power invertors, entertainment system components, and the like.

An operation 116 is performed for starting the vehicle's engine after for inhibiting the first battery load from drawing current from the battery charging system. Starting of the engine is implemented using appropriate signalling within necessary circuitry of the vehicle (e.g., via a control module system circuitry of the vehicle) without the need for physical human interaction within the vehicle. In this manner, the vehicle is remotely started even if the vehicle itself is the entity that issues the remote start activation command.

After starting the engine, an operation 118 is performed for inhibiting a battery load associated with (e.g., required for) vehicle operations required during starting during starting of the vehicle (i.e., a second battery load) from drawing current from the electrical charging system of the vehicle. It is disclosed herein that the second battery load can include current draw from a single current drawing component of the vehicle or current draw from multiple current drawing components of the vehicle. Current draw components corresponding to the second battery load can be those that are operable only with ignition circuitry of the vehicle energized (i.e., activated) and/or those that are operable while a starter of the vehicle is energized. Examples of current drawing components of the vehicle which can contribute to the second battery load include, but are not limited to, instrument panel backlighting, passive entry/passive start functionality, antenna power, interior courtesy lighting, exterior lighting (e.g., with possible exception of park lamps being allowed to flash for indicating operation of remote start charging event in progress), alarm intrusion components, power access point(s), cigarette lighter(s), power invertors, entertainment system components and the like.

After inhibiting the second battery load from drawing electrical current from the battery charging system, an operation 120 is performed for determining if any safe conditions have been violated in response to and/or after inhibiting the first battery load, inhibiting the second battery load, and/or starting the engine. Examples of such safe conditions include, but are not limited to, those mentioned above in reference to the operation 108 for determining if conditions for allowing the engine of the vehicle to be safely started have been met. Examples of such safe conditions also include, but are not limited to, an operating condition (e.g., temperature) of an exhaust or emissions component exceeding an temperature limit, a closure structure (e.g., door, hood, trunk) of the vehicle being opened, ignition switch or start button being engaged without valid key/electronic fob, a brake pedal being pushed, an antitheft system receiving a signal indicating a potential theft/intrusion, location on paved surface as opposed to non-paved surface (e.g., grass) and the like.

An operation 122 is performed for stopping the engine if any safe condition is determined to be violated. If it is determined that no safe conditions have been violated, an operation 124 is performed for optimizing output of an alternator of the vehicle. It is disclosed herein that a vehicle can have more than one alternator and, thus, embodiments of the present invention can be configured to optimize output of one or both of such alternators. Examples of optimizing the alternator output include, but are not limited to, causing an output of the alternator of the vehicle to be maintained significantly above an idle output level (e.g., significantly above output level during regular operation of the engine) after starting the engine (e.g., by operating the engine at a speed significantly above its target idle speed), causing the output of the alternator to be adjusted dependent upon a present location of the vehicle, causing the output of the alternator to be adjusted dependent upon engine operating temperature(s), causing the output of the alternator to be adjusted dependent upon ambient temperature at the present location of the vehicle, and the like. It is disclosed herein that causing the output of the alternator to be maintained above the idle output level can include determining a location of the vehicle and causing the engine to operate at an engine speed above the target idle speed in response to determining that the vehicle is at a location determined to be acceptable for operating the engine at an engine speed above the target idle speed. Examples of target idle speed can include an idle speed of the engine during closed-loop mode of operation, an idle speed during a regular driving mode of the vehicle, and an idle speed when the vehicle is not being operated for optimizing a battery charging even in accordance with the present invention. Such determination of the location of the vehicle includes determining whether the vehicle is parked at an outdoor/open parking structure determined to be an acceptable location for operating the engine at an engine speed above the target idle speed. It is also disclosed herein that, if vehicle power supply regulation is managed by a suitable control system module (e.g., a processor based module), optimizing the alternator output can include adjusting a voltage regulation set point from a normal value (e.g., 12.8 volts) to a higher value (e.g., 15.5 volts) after the engine is started by the remote start charging mode, causing circuits having an incandescent lamp to be deactivated while the voltage regulation set point is at the higher level, and causing such circuits having an incandescent lamp to be re-activated in conjunction with ending the method 100 (e.g., immediately prior to the engine being stopped). Furthermore, if alternator output cannot be safely maintained at an elevated level (i.e., maximum safe optimized output), optimizing the alternator output can include extending engine run time beyond a preset normal remote start charging mode run time in order to accomplish an acceptable and/or intended battery SOC.

After optimizing the alternator output, an operation 126 is performed for determining if a desired state of charge (SOC) has been met. Examples of parameters upon which the desired SOC can be based include, but are not limited to, a length of time that the engine has been running, a voltage change during the duration of time that the engine has been running, a voltage level of the battery, and the like. If it is determined that the desired SOC has not been met, the method 100 can continue to check if the desired SOC has been met during operation of the engine. If it is determined that the desired SOC has been met, the method proceeds to the operation 122 for stopping the engine, which ends the outdoor/open parking structure implementation of the battery charging event. Thereafter, the method 100 can include further operations, such as for reactivating any components and/or functionalities deactivated in association with performing the outdoor implementation of the battery charging event.

Referring now to FIG. 1C, the method 100 proceeds with implementing the battery charging event suitably configured for indoor operation of the vehicle's engine in response to determining that vehicle is at an indoor location. An operation 128 is performed for inhibiting a battery load corresponding to vehicle operations not required for starting of the vehicle (i.e., a first battery load), which can be the same as the first battery load discussed above in reference to FIG. 1B. After inhibiting the first battery load from drawing current from the battery charging system, an operation 130 is performed for starting the vehicle's engine. As discussed above in reference to FIG. 1B, starting of the engine is implemented using appropriate signalling within necessary circuitry of the vehicle (e.g., via a control module system circuitry of the vehicle) without the need for physical human interaction within the vehicle.

After starting the engine, an operation 132 is performed for inhibiting a battery load corresponding to vehicle operations required during starting during starting of the vehicle (i.e., a second battery load) from drawing current from the electrical charging system of the vehicle, which can be the same as the second battery load discussed above in reference to FIG. 1B. After inhibiting the second battery load from drawing electrical current from the battery charging system, an operation 134 is performed for determining if any safe conditions have been violated in response to and/or after inhibiting the first battery load, inhibiting the second battery load, and/or starting the engine. Such safe conditions can be the same as those discussed above in reference to FIG. 1B. If any safe condition is determined to be violated, an operation 136 is performed for stopping the engine.

If it is determined that no safe conditions have been violated, an operation 138 is performed for optimizing output of the alternator of the vehicle. Examples of optimizing the alternator output can be the same as those discussed above in reference to FIG. 1B. After optimizing the alternator output, an operation 140 is performed for determining if an indoor run time has been met. It is disclosed herein that the indoor run time is a length of time that allows for safe operation of the vehicle's engine within an indoor environment. Such indoor run time can be dependent upon time of day, a GPS location of the vehicle, a known or anticipated location of the vehicle, and the like.

If it is determined that the indoor run time has been met, the method 100 proceeds to the operation 136 for stopping the engine, which ends the indoor implementation of the battery charging event. Thereafter, the method 100 can include further operations, such as for reactivating any components and/or functionalities deactivated in association with performing the indoor implementation of the battery charging event. If it is determined that the indoor run time has not been met, an operation 142 is preformed for determining if a desired state of charge (SOC) of the battery has been met. Examples of parameters upon which the desired SOC can be based can include those discussed above in reference to FIG. 1B. If it is determined that the desired SOC has been met, the method proceeds to the operation 136 for stopping the engine, which ends the indoor implementation of the battery charging event. Otherwise, charging of the battery continues until either the indoor run time has met or the desired SOC has been met. It is disclosed herein that in an alternate embodiment of the present invention, if it cannot be determine that the vehicle is at an outdoor/open parking structure, the indoor implementation of the battery charging event indoor can be carried out in a manner in which the vehicle can be allowed to start but with run time and/or engine operating speed idle being maintained at reduced levels relative to those capable in an optimized alternator output approach in accordance with the present invention.

Figure 2:
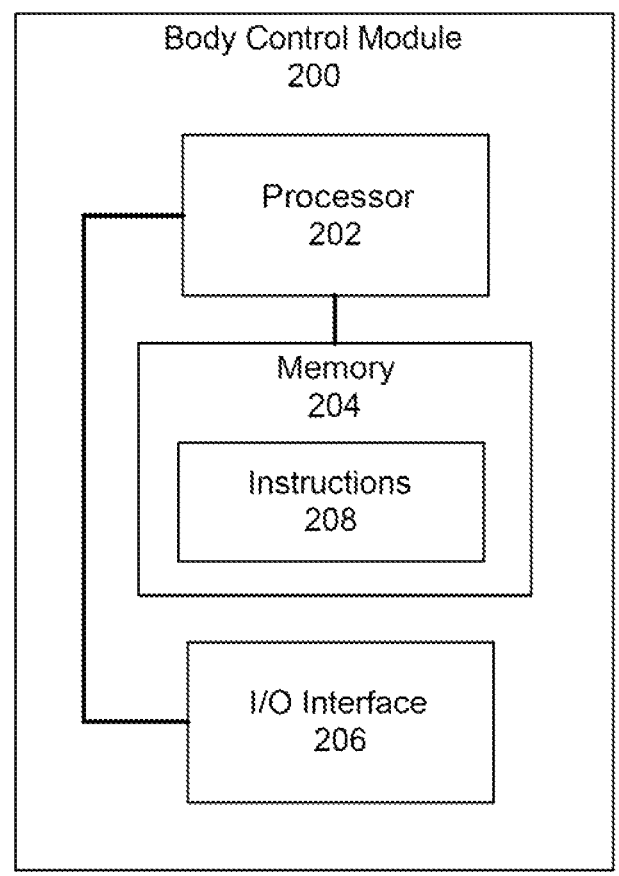
FIG. 2 is a block diagram representation of a body control module configured in accordance with an embodiment of the present invention.

FIG. 2 shows a body control module 200 configured in accordance with an embodiment of the present invention. It is disclosed herein that the body control module 200 is one example of a processor-based module of a vehicle control module system capable of being configured for providing (e.g., controlling) remote start charging mode in accordance with the present invention. In view of the disclosures made herein, a skilled person will understand and be provided with the knowledge for similarly configuring another module of a vehicle control module system or jointly configuring a plurality of other modules of a vehicle control module system for providing remote start charging mode in accordance with the present invention.

The body control module 200 includes a processor 202, memory 204, an input-output (I/O) interface 206, and instructions 208. The memory 204 and the I/O interface 206 are coupled to the processor 202 for allowing communication of information therebetween. The I/O interface 206 is configured for allowing communication of information between the body control module 200 and other control modules of a vehicle's control module system. In one embodiment, the I/O interface 206 is a signal multiplexer capable of multiplexing and de-multiplexing signal received from and transmitted for reception by other control modules of the vehicle's control module system.

The instructions 208, which are configured for causing remote start charging mode of operation of a vehicle for providing a battery charge event as disclosed herein, are stored on the memory 204 and are accessible therefrom by the processor 202. In one specific embodiment, the instructions 208 are tangibly embodied for carrying out the method 100 disclosed above or similarly configured methods. As such, the memory 204 represents one example of a processor-readable medium having instructions tangibly and non-transiently embodied thereon that are configured for carrying out functionality in accordance with such remote start charging mode.

Figure 3:
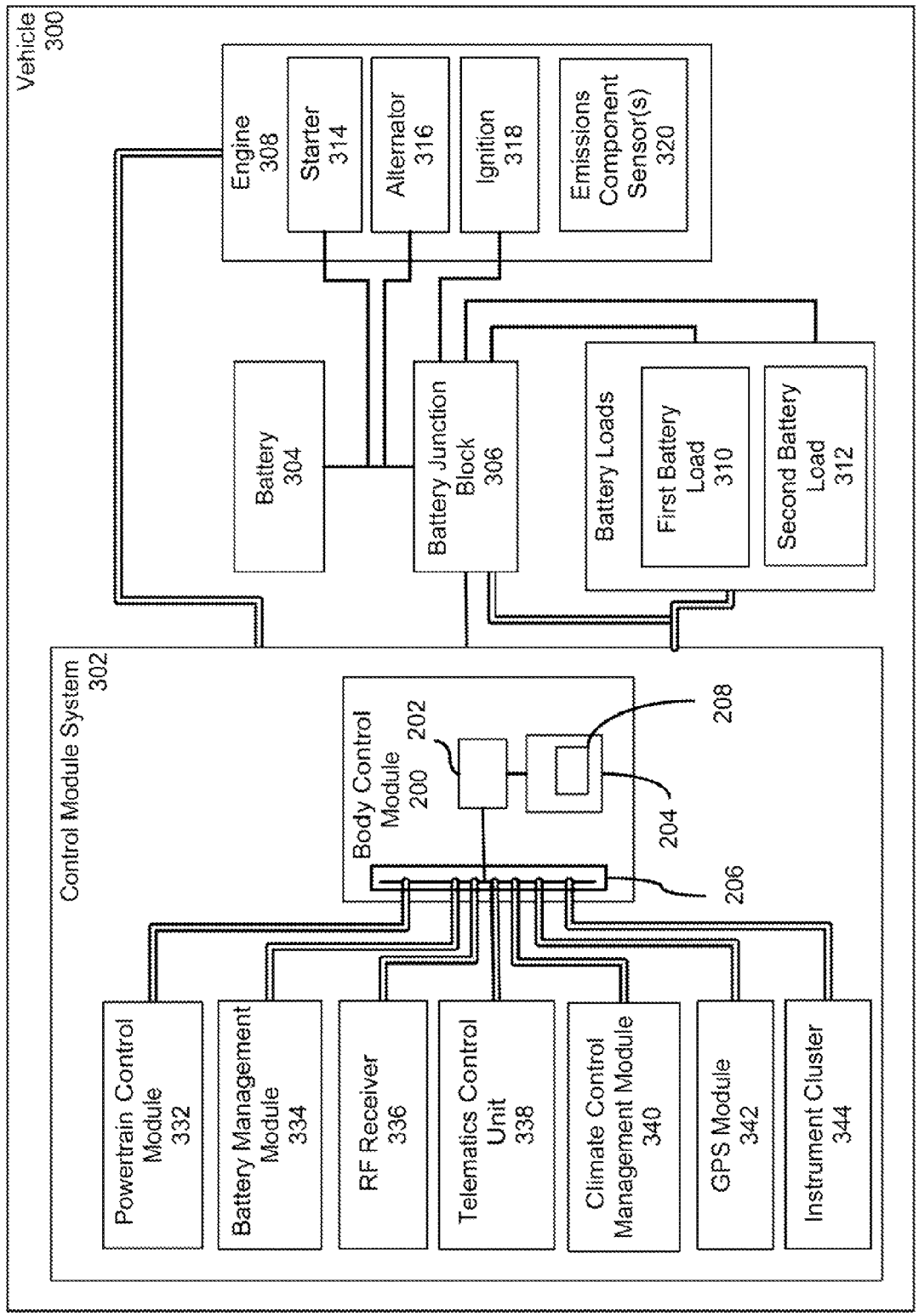
FIG. 3 is a block diagram representation of a vehicle configured in accordance with an embodiment of the present invention is shown.

Referring now to FIG. 3, a block diagram representation of a vehicle 300 configured in accordance with an embodiment of the present invention is shown. The vehicle 30 includes a control module system 302, a battery 304, a battery junction block 306, an engine 308, and a plurality of battery loads (e.g., a first battery load 310 and second battery load 312). As depicted by the solid lines, the control module system 302, the engine 308, and the battery loads 310, 312 are each connected to the battery 304 directly and/or through the battery junction block 306 thereby enabling electrical current to be provided between control module system 302, the battery 304, the engine 308, and the battery loads 310, 312. As depicted by the hollowed lines, the control module system 302, the battery junction block 306, the engine 308, and the battery loads 310, 312 are also connected to control module system 302 for providing control signalling and/or selective power distribution between the control module system 302, the battery junction block 306, the engine 308 (i.e., discrete components thereof), and the battery loads 310, 312. For example, the battery junction block can be configured for allowing electrical current to be selectively provided from the battery to various vehicle operating components (e.g., the battery loads 310, 312). It is disclosed herein that the battery junction block can be a constituent of the control module system and be connected to the I/O interface 206 of the body control module 200. With regard to discrete components of the engine 308, in the depicted embodiment, the engine 308 includes a starter 314, an alternator 316, an ignition 318, and an emissions component sensor 320 (e.g., a sensor capable of sensing a temperature of a catalytic converter). The starter 314 and the alternator 316 are each connected directly to the battery 304 whereas the ignition 318 and the emissions component sensor 320 are connected to the battery through the battery junction block 306.

The control module system 302 includes the body control module 200, a power control module 332, a battery management module 334, an RF (radio frequency) receiver 336, a telematics control unit 338, a climate control management module 340, a GPS module 342, and a instrument cluster 344. The power control module 332, the battery management module 334, the RF receiver 336, the telematics control unit 338, the climate control management module 340, the GPS module 342, and the instrument cluster 344 are each connected to the I/O module 206 of the body control module 200 for allowing information (e.g., control signalling, data, etc) to be selectively communicated therebetween. In particular, control signalling and/or data required for providing remote start charge mode functionality as disclosed herein is received by the body control module 200 from necessary ones of the other control modules of the control module system 302 and/or is provided from the body control module 302 to necessary ones of the other control modules of the control module system 302.

Each one of the control modules of the control module system 302 is configured for controlling and/or providing information pertaining to respective vehicle operating conditions and/or components. In addition to being configurable for providing remote start charging mode of operation of a vehicle for providing a battery charge event as disclosed herein, the body control module 200 is an example of a control module configured for providing control of high current loads (e.g., constituents of the battery loads 310, 312). Examples of such high current loads include, but are not limited to, exterior lighting, interior lighting, heated seats, heated windshield, heated backlight, and heated mirrors. Additionally, the body control module 200 is an example of a control module configured for providing keyless entry and point of access status verification (e.g., closure status of hood, door, and trunk). The powertrain control module 332 is an example of a control module configured for providing control of engine operating components (e.g., idle control components, fuel delivery components, emissions control components, etc) and for monitoring status of such engine operating components (e.g., status of engine fault codes). The battery management module 334 is an example of a control module configured for providing state of charge status. The RF receiver 336 is an example of a control module configured for receiving remote start commands transmitted via radio frequency. The telematics control unit 338 is an example of a control module configured for providing for receiving remote start commands from a phone or web connection and also for sending out low battery alerts to a phone or a web database. The climate control management module 340 is an example of a control module configured for providing load control of heating and cooling system components (e.g., compressor clutch, blower fan, etc). The GPS module 342 is an example of a control module configured for providing vehicle location information. The instrument cluster 344 is an example of a control module configured for providing vehicle status information such as fuel level info, engine operating temperature information, etc. As depicted, the abovementioned modules are represented as discrete modules. However, a skilled person will appreciate that such modules can share physical hardware and/or firmware, that the functionality of two or more of such modules can be integrated into a single module, and that the functionality of two or more of such modules can be distributed among a plurality of modules.

In view of the disclosures made herein, a skilled person will appreciate that embodiments of the present invention provide an effective and efficient approach to addressing what is referred to herein as battery voltage degradation (i.e., also known as battery rot). Battery voltage degradation refers to the degradation of a battery of motor vehicles due to small electrical current draw when the vehicle sits unstarted for a suitable period of time (e.g., quiescent power, typically on the order of 10-30 mA). Depending on the current draw and the battery chosen for the vehicle, this steady current draw will slowly reduce the vehicle battery voltage to a point where there is no longer adequate voltage to start the vehicle. Most vehicle manufacturers specify a battery that will support 30 days of lot storage prior to the vehicle being started. However, when vehicle sales are down and/or when there is a plant quality issues that causes the manufacturer to temporarily inventory vehicles, the vehicles can be parked for as long as 120 days or more. Accordingly, it can become a considerable expense to recharged or replaced batteries of such vehicles in the event that the battery is drained to a point that precludes starting the vehicle. Similarly, protecting against these extended storage periods with a larger battery is expensive, adds cost to the vehicles, and adds significant weight to the vehicles. In contrast to these shortcomings associated with a larger battery, implementing a remote starting charging mode in accordance with an embodiment of the present invention would not add any substantial material cost and, more importantly, would not be activated unless a vehicle was at risk of reaching too low of a battery voltage to start the vehicle. This approach avoids cost from other known solutions (e.g. to 100% of an OEM vehicle fleet) and results only in the cost of fuel (e.g., 1 additional gallon) if and when a low voltage condition is determined to exist.

With regard to fuel consumption considerations, embodiments of the present invention offer a number of benefits as compared to conventional approaches for addressing battery voltage degradation. One such benefit relating to fuel consumption is that no fuel is used unless the battery SOC is considered so low that a no-start is at risk. Another such benefit relating to fuel consumption is that, depending on the SOC, temperature, and/or other factors, the amount of fuel consumed when charging a battery in accordance with the present invention may be sufficiently small such that there is no need to increase the standard Vehicle Operations (VO) fuel fill (e.g., 2 gallons) or the standard fuel fill amount used by vehicle dealers (e.g., often a full tank as a courtesy to new customers). Another such benefit relating to fuel consumption is that the proposition of increasing the VO fuel fill (e.g., by 1 gallon) for supporting charging a battery in accordance with the present invention would add minimal cost as compared to a larger battery, a service call, and/or a warranty issue.

With regard to carbon footprint considerations, embodiments of the present invention offer a number of benefits as compared to conventional approaches for addressing battery voltage degradation. One such benefit relating to carbon footprint is that no fuel is used unless and until there is a low SOC situation that risks a no-start. Another such benefit relating to carbon footprint is that charging a battery in accordance with the present invention requires no more fuel (and likely less fuel) than recharging the battery during a normal (i.e., prior art) start cycle. Another such benefit relating to carbon footprint is that, in contrast to a vehicle's battery becoming fully discharged (i.e., "dead") due to the vehicle not being started, charging the battery in accordance with the present invention prior to its battery becoming dead is more efficient than a service event requiring either towing the vehicle or picking up a new battery, taking it to the vehicle, and then taking the dead battery back to either a safe-disposal facility or dedicated battery recharging bank/rack.

With regard to financial cost considerations, embodiments of the present invention offer a number of benefits as compared to conventional approaches for addressing battery voltage degradation. One such benefit relating to financial cost is that there should be no incremental vehicle cost for typical storage times (e.g., 30-day storage). Another such benefit relating to financial cost is that there should be minimal incremental vehicle cost if extra fuel (e.g., $3 for an additional gallon) is needed to support an extended storage time (e.g., 120-day storage). Another such benefit relating to financial cost is that ancillary components that may need to be added to support charging a battery in accordance with the present invention are nominal (e.g., potentially as little as $2) provided the vehicle has a suitable power mode architecture. Another such benefit relating to financial cost is that use of a vehicle's existing systems avoids added weight and relatively high replacement cost associated with some prior art solutions. Another such benefit relating to financial cost is that charging a battery in accordance with the present invention avoids the VO labor costs resulting from a vehicle no start due to a dead battery (e.g., typically requires 1 to 2 people to repair/service a vehicle with a dead battery). Another such benefit relating to financial cost is that, by not shedding or disabling any of the vehicle's existing KOL systems prior to recharging the battery, charging a battery in accordance with the present invention reduces the amount of warranty claims for erratic operation, replaced batteries, and also labor only claims for recharging batteries.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for providing a battery charging event, comprising: inhibiting a first battery load from drawing electrical current from a battery charging system of a vehicle; starting an engine of the vehicle after said inhibiting of the first battery load; and causing an output of an alternator of the vehicle to be maintained above a target idle output after starting the engine; wherein causing the output of the alternator to be maintained above the target idle output includes: determining a location of the vehicle; and causing the engine to operate at an engine speed above a target idle speed in response to determining that the vehicle is at a location determined to be acceptable for operating the engine at an engine speed above the target idle speed.

2. The method of claim 1 wherein inhibiting the first battery load includes precluding the first battery load from drawing electrical current from the battery upon activation of ignition circuitry of the vehicle and after said starting of the engine.

3. The method of claim 1, further comprising:
inhibiting a second battery load from drawing electrical current from the battery charging system after starting the engine.

4. The method of claim 3 wherein inhibiting the first battery load includes precluding the first battery load from drawing electrical current from the battery charging system upon activation of ignition circuitry of the vehicle and after said starting of the engine.

5. The method of claim 1 wherein:
determining the location of the vehicle includes determining whether the vehicle is parked at an outdoor/open parking structure; and
the outdoor/open parking structure is a location determined to be an acceptable location for operating the engine at an engine speed above the target idle speed.

6. The method of claim 1, further comprising;
determining a location of the vehicle, wherein said starting of the engine is performed only if the location of the vehicle is determined to be a location acceptable for allowing said starting of the engine.

7. The method of claim 1, further comprising:
monitoring a temperature of an exhaust system component of the vehicle; and
causing the engine to turn off in response to determining that the exhaust system component has attained an operating temperature determined to be unacceptable for continued operation of the engine.

8. The method of claim 1 wherein causing the output of the alternator to be maintained above the target idle output include causing the engine to operate at an engine speed above a target idle speed in response to determining that the vehicle is at a location determined to be acceptable for operating the engine at an engine speed above the target idle speed.

9. The method of claim 8 wherein:
  determining the location of the vehicle includes determining whether the vehicle is parked at an outdoor/open parking structure;
  the outdoor/open parking structure is a location determined to be an acceptable location for operating the engine at an engine speed above the target idle speed; and
  wherein inhibiting the first battery load includes precluding the first battery load from drawing electrical current from the battery charging system upon activation of ignition circuitry of the vehicle and after said starting of the engine.

10. A method for providing a battery charging event, comprising: inhibiting a first battery load from drawing electrical current from a battery charging system of a vehicle; activating ignition circuitry of the vehicle after said inhibiting of the first battery load; starting the engine after said ignition circuitry activation; inhibiting a second battery load from drawing electrical current from the battery charging system after said starting of the engine; and causing an output of an alternator of the vehicle to be adjusted dependent upon a present location of the vehicle; wherein causing the output of the alternator to be adjusted dependent upon the present location of the vehicle includes: determining a location of the vehicle; and causing the engine to operate at an engine speed above a target idle speed in response to determining that the vehicle is at a location determined to be acceptable for operating the engine at an engine speed above the target idle speed.

11. The method of claim 10 wherein inhibiting the first battery load includes precluding the first battery load from drawing electrical current from the battery charging system upon activation of ignition circuitry of the vehicle and after said starting of the engine.

12. The method of claim 10 wherein:
  determining the location of the vehicle includes determining whether the vehicle is parked at an outdoor/open parking structure; and
  the outdoor/open parking structure is a location determined to be an acceptable location for operating the engine at an engine speed above the target idle speed.

13. The method of claim 12 wherein inhibiting the first battery load includes precluding the first battery load from drawing electrical current from the battery charging system upon activation of ignition circuitry of the vehicle and after said starting of the engine.

14. The method of claim 10, further comprising:
  determining a location of the vehicle, wherein said starting of the engine is performed only if the location of the vehicle is determined to be a location acceptable for allowing said starting of the engine.

15. The method of claim 10, further comprising:
  monitoring a temperature of an exhaust system component of the vehicle; and
  causing the engine to turn off in response to determining that the exhaust system component has attained an operating temperature determined to be unacceptable for continued operation of the engine.

16. The method of claim 10 wherein causing the output of the alternator to be adjusted dependent upon the present location of the vehicle includes:
  causing the engine to operate at an engine speed above a target idle speed in response to determining that the vehicle is at a location determined to be acceptable for operating the engine at an engine speed above the target idle speed.

* * * * *